(12) United States Patent
He et al.

(10) Patent No.: US 7,824,099 B2
(45) Date of Patent: Nov. 2, 2010

(54) ACCURATE GAS TEMPERATURE ESTIMATION AT TRANSIENT CONDITIONS BASED ON TEMPERATURE SENSOR READINGS

(75) Inventors: Yongsheng He, Sterling Heights, MI (US); Paul Anthony Battiston, Clinton Township, MI (US); Alexandros C. Alkidas, Troy, MI (US)

(73) Assignee: GM Global Technology Operations, Inc., Detroit, MI (US)

( * ) Notice: Subject to any disclaimer, the term of this patent is extended or adjusted under 35 U.S.C. 154(b) by 386 days.

(21) Appl. No.: 11/946,995

(22) Filed: Nov. 29, 2007

(65) Prior Publication Data
US 2009/0141768 A1 Jun. 4, 2009

(51) Int. Cl.
*G01K 7/00* (2006.01)
(52) U.S. Cl. .......................... 374/144; 274/179; 274/43
(58) Field of Classification Search .................. 374/144, 374/43, 179
See application file for complete search history.

(56) References Cited

U.S. PATENT DOCUMENTS

| | | | | |
|---|---|---|---|---|
| 2,820,839 A | * | 1/1958 | Schunke | 136/231 |
| 3,776,039 A | * | 12/1973 | Bowen | 374/147 |
| 4,038,105 A | * | 7/1977 | Brandeberry et al. | 136/231 |
| 4,187,434 A | * | 2/1980 | Pater et al. | 250/515.1 |
| 5,348,395 A | * | 9/1994 | Corr et al. | 374/135 |
| 5,379,584 A | | 1/1995 | Windish et al. | |
| 5,414,994 A | | 5/1995 | Cullen et al. | |
| 5,586,544 A | | 12/1996 | Kitamura et al. | |
| 5,756,878 A | * | 5/1998 | Muto et al. | 73/25.03 |
| 6,076,964 A | * | 6/2000 | Wu et al. | 374/141 |
| 6,116,083 A | | 9/2000 | Cullen et al. | |
| 6,325,535 B1 | * | 12/2001 | Gibson et al. | 374/29 |
| 6,401,457 B1 | | 6/2002 | Wang et al. | |
| 6,755,078 B2 | | 6/2004 | Hernandez et al. | |
| 6,993,909 B2 | | 2/2006 | Matsunaga et al. | |
| 2006/0024630 A1 | * | 2/2006 | Williamson et al. | 431/254 |
| 2006/0063990 A1 | * | 3/2006 | Cho et al. | 600/316 |
| 2009/0041084 A1 | * | 2/2009 | Sakami et al. | 374/179 |
| 2009/0064663 A1 | * | 3/2009 | Ma et al. | 60/277 |

\* cited by examiner

*Primary Examiner*—Lisa M Caputo
*Assistant Examiner*—Mirellys Jagan

(57) ABSTRACT

A method for accurate estimation of a gas temperature at transient conditions includes measuring temperature sensor readings in a gas flow and estimating the gas temperature by equating the specific heat properties of the temperature sensor to the sum of conductive heat, convective heat, and radiative heat acting upon the temperature sensor and solving for the gas temperature.

20 Claims, 3 Drawing Sheets

ACCURATE GAS TEMPERATURE ESTIMATION AT TRANSIENT CONDITIONS BASED ON TEMPERATURE SENSOR READINGS

TECHNICAL FIELD

This disclosure is related to temperature measurement of a gas flow at transient conditions.

BACKGROUND

Combustion within an engine produces heat and a flow of chemical by-products as an exhaust gas flow. Various methods exist for modulating the combustion process to improve fuel efficiency and control exhaust gas emissions. One important property used to monitor the combustion process and the aftertreatment of the exhaust gas flow is the exhaust gas temperature. Temperature sensors are well known for monitoring temperature in a gas flow. However, temperature sensors measure the temperature of the temperature sensor and not the temperature of the gas flow. Heat energy must flow between the gas flow and the temperature sensor for temperature changes in the gas flow to be measured. This resulting temperature response in the temperature sensor to the flow of heat energy introduces a delay or lag relative to temperature changes in the gas flow. Additionally, the temperature of the temperature sensor is a result or a summation of historical heat flows. This summing or averaging effect upon temperature sensor temperatures masks high speed or alternating changes in temperature in the gas flow, reducing the sensitivity of the temperature sensor readings. Results of the lag and averaging errors of temperature sensor readings in an exhaust gas flow include compromises in engine control and management of exhaust gas aftertreatment.

SUMMARY

A method for accurate estimation of a gas temperature in a gas flow at transient conditions based on temperature sensor readings includes measuring the temperature sensor readings from a temperature sensor in the gas flow and estimating the gas temperature on the basis of the temperature sensor readings, wherein the estimating includes equating the specific heat properties of the temperature sensor to the sum of conductive heat, convective heat, and radiative heat acting upon the temperature sensor and solving for the gas temperature.

BRIEF DESCRIPTION OF THE DRAWINGS

One or more embodiments will now be described, by way of example, with reference to the accompanying drawings, in which.

DETAILED DESCRIPTION

Figure 1:
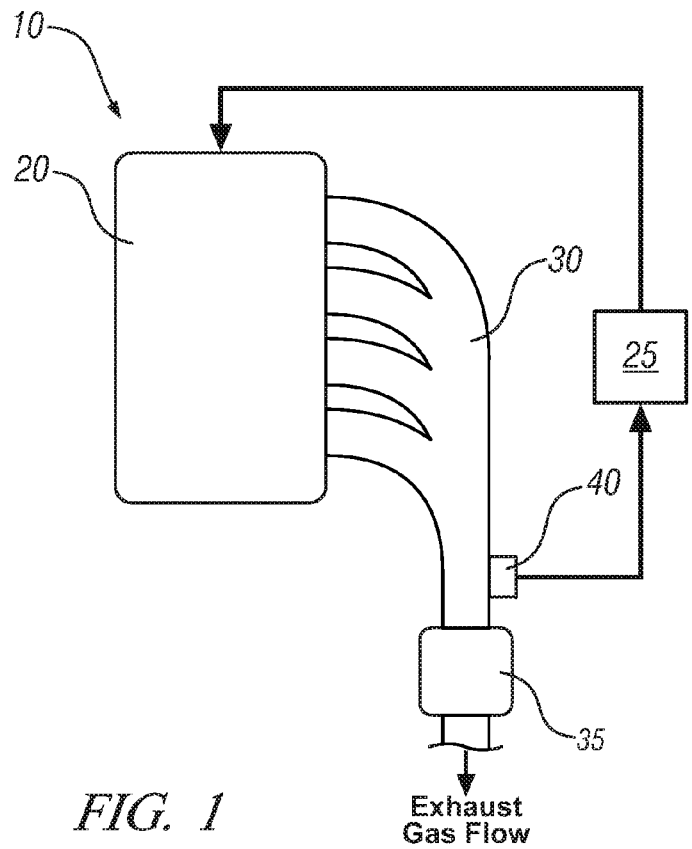
FIG. 1 is a schematic diagram of an exemplary vehicle equipped with a temperature sensor in accordance with the present disclosure.

Referring now to the drawings, wherein the showings are for the purpose of illustrating certain exemplary embodiments only and not for the purpose of limiting the same, FIG. 1 schematically illustrates vehicle 10 equipped with temperature sensor 40 in accordance with the disclosure. Vehicle 10 includes engine 20, engine control module 25, exhaust manifold 30, exhaust aftertreatment system 35, and temperature sensor 40. Engine 20 combusts fuel to propel vehicle 10. Exhaust system 30 and exhaust aftertreatment system 35 provide a path for the exhaust gas generated in the combustion process to be processed for certain emission reductions and then to be expelled from vehicle 10.

Modern engines utilize various schemes to improve fuel efficiency and to reduce the emissions from the combustion process. Engine control module 25 processes information from various inputs and modulates the operation of engine 20 and processes in exhaust aftertreatment system 35 referred to as aftertreatment. The temperature of the exhaust gas flow is an important property to the various schemes run by engine control module 25 as exhaust gas temperature reflects both conditions within the combustion process of engine 20 and properties of the exhaust gas flow itself important to aftertreatment the exhaust gas. Engine 20 is also dynamic in as much as an engine may change from an idle state to a full-open throttle condition in a very short period of time. Schemes run by engine control module 25 must be able to react to the dynamic conditions of engine 20 in order to accurately control the various processes to keep engine 20 running efficiently and to manage exhaust gas flow aftertreatment. Therefore, accurate and timely estimation of the exhaust gas temperature is important to fuel and emission efficient operation of an engine. It should also be appreciated that while an embodiment is described utilizing temperature sensor 40 in an internal combustion engine exhaust gas flow process, the disclosure is equally valid in any flow of material in any process.

Figure 2:
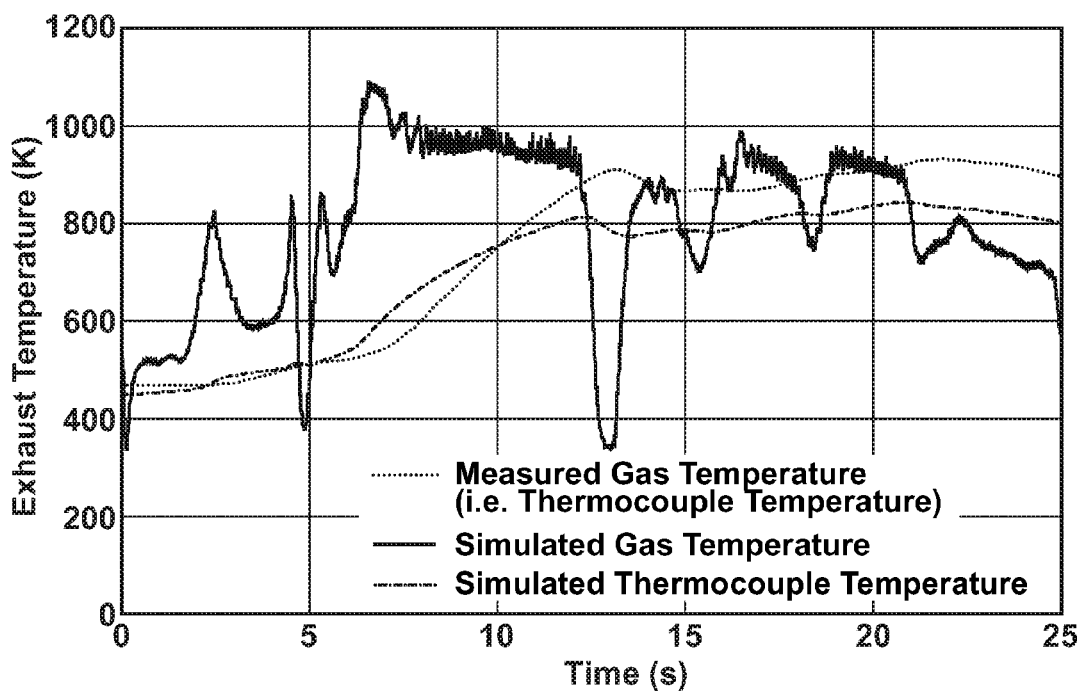
FIG. 2 is a graphical representation of test results of an exemplary known system utilizing a temperature sensor to measure exhaust gas temperatures in accordance with the present disclosure.

FIG. 2 graphically depicts test results of a known system wherein readings are taken from temperature sensor 40 in the form of a thermocouple. An engine is operated in various states of operation and readings are taken from a thermocouple located in the exhaust system. The simulated gas temperature illustrated on the graph is generated by an off-line computer model and estimates the actual exhaust gas temperature. The actual temperature of the exhaust gas as simulated quickly changes over 400 Kelvin in around seven seconds. Both the readings of the thermocouple temperature and a simulation of the thermocouple temperature show that the thermocouple temperature lags several seconds behind the actual exhaust gas temperature and embodies an average temperature for the exhaust gas over time. The behavior of the thermocouple in the heated exhaust gas and the lag in thermocouple temperature readings can best be described by the specific heat equation, $$Q = m \cdot c \cdot \Delta T \qquad [1]$$

wherein Q describes the heat energy applied to an object, m describes the mass of the object, c describes the property of specific heat of the object, and $\Delta T$ describes the resulting change in temperature to the object. The specific heat term, c, describes how much energy a mass unit of the material requires to increase temperature by a set amount. Heat energy, Q, flowing from high temperature exhaust gas, is transferred to the thermocouple, causing the thermocouple to rise by a temperature ΔT. The temperature of the thermocouple does not instantly change to the temperature of the exhaust gas flow, but rather the temperature of the thermocouple rises as heat flows into the thermocouple from the exhaust gas flow. This specific heat equation may used to show the relationship of heat to temperature rise per unit time by taking the time derivative of the equation. This equation becomes, $$\frac{dQ}{dt} = m \cdot c \cdot \frac{dT}{dt} \quad [2]$$

showing that the rate of heat energy flow into an object with mass m and specific heat c is directly proportional to the rate of temperature increase.

As described above, the rate of heat flow into the thermocouple dictates the resulting increase in temperature. Heat flow is described by three general forms of heat transfer: conduction, convection, and radiation. Conduction describes the flow of heat energy from one object to another object in direct connection to each other. The rate of heat transfer by conduction may be described by Fourier's Law, stating, $$\frac{dQ}{dt} = U \cdot A \cdot (\Delta T) \quad [3]$$

wherein U equals conductance and A equals the cross-sectional area of contact between the two objects. Convection describes heat flow through a fluid or gaseous medium to an object. The rate of heat transfer by convection may be described by Newton's Law of Cooling, stating, $$\frac{dQ}{dt} = h \cdot A \cdot (T_{medium} - T_{object}) \quad [4]$$

wherein h equals a heat transfer coefficient and A equals the surface area of the object exposed to the medium. Radiation describes heat flow from a hot object to another object across a gap in the form of electromagnetic radiation, for example infrared energy. The rate of heat transfer by radiation to a relatively small object enclosed by a larger surface may be described by the Stefan-Boltzmann Law, stating, $$\frac{dQ}{dt} = \varepsilon \cdot \sigma \cdot A_{object} \cdot (T_{surface}^4 - T_{object}^4) \quad [5]$$

wherein ε equals emissivity and σ equals Stefan's constant. One may sum the three previous equations to describe the total rate of heat transfer to an object. For a relatively small object surrounded by a surface and immersed in a gaseous medium, one may form an equation showing the effect of heat transfer upon the object to the temperature of that object by equating the specific heat equation to the sum of the heat transfer equations. The resulting equation, describing the relationship of the temperature of the object to the various forms of heat transfer, would be the following:

$$m \cdot c \cdot \frac{dT_{object}}{dt} = U \cdot A \cdot (\Delta T) + \\ h \cdot A_{object} \cdot (T_{medium} - T_{object}) + \varepsilon \cdot \sigma \cdot A_{object} \cdot (T_{surface}^4 - T_{object}^4) \quad [6]$$

Figure 3:
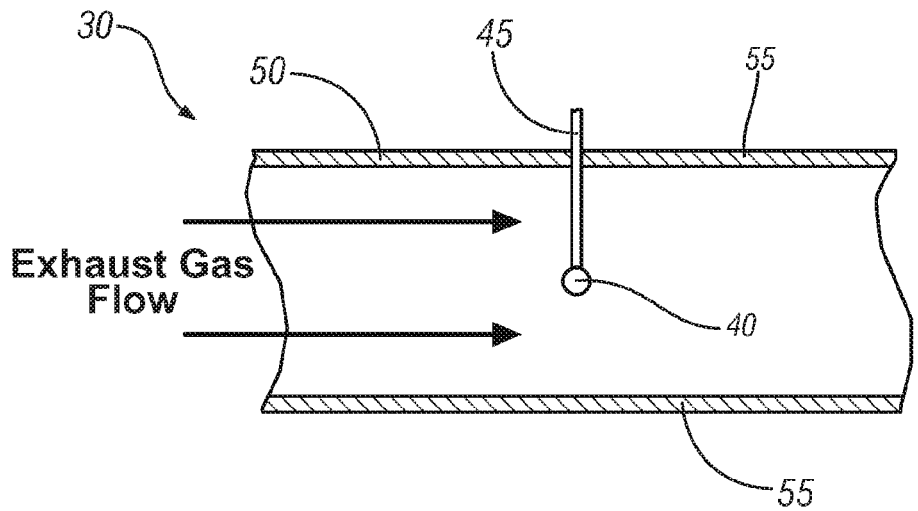
FIG. 3 is a cross-sectional schematic diagram of an exemplary temperature sensor located inside an exhaust pipe in accordance with the present disclosure.

Heat transfer rates are dependant upon the specific properties of the system being utilized. FIG. 3 illustrates in cross-section an exemplary embodiment of a temperature sensor 40 in the form of a thermocouple located within an exhaust system 30 in accordance with the disclosure. Exhaust system 30 comprises an exhaust pipe 50 with walls 55. Exhaust pipe 50 as depicted is assumed round in cross-section, however with only minor variations to resulting calculations by means well known in the art, exhaust system 30 could take virtually any shape and still be valid within this disclosure. Temperature sensor 40 is located within exhaust pipe 50 and is connected to outside devices by electrical lead 45. As is well known in the art, the flow of gas through exhaust pipe 50 follows a cross-sectional profile, and it is preferable to use some means such as electrical lead 45 to place temperature sensor 40 within some portion of the flow away from wall 55. The exhaust gas flow travels through exhaust pipe 50 and travels around temperature sensor 40. Heat from the exhaust gas flow enters electrical lead 45 which may then transfer heat to temperature sensor 40 in the form of conductance. However, the cross-section of electrical lead 45 leading into the thermocouple in this particular embodiment is so small that this heat transfer by conductance can be said to be negligible. Heat from the exhaust gas flow enters temperature sensor 40 directly through convection, and this heat transfer may be described by Newton's Law of Cooling. Heat from the exhaust gas flow is transferred to walls 55, which then radiate heat to temperature sensor 40. This heat by radiation may be described by the Stefan-Boltzmann Law. The resulting equation describing the relationship of the change in temperature of a temperature sensor ("$T_{TS}$") to the various sources of heat transfer becomes, $$m_{TS} \cdot c_{TS} \cdot \frac{dT_{TS}}{dt} = U_{TS} \cdot A_{contact} \cdot (T_{lead} - T_{TS}) + \\ h_{TS} \cdot A_{TS} \cdot (T_{TS} - T_{exhaustgas}) + \varepsilon \cdot \sigma \cdot A_{TS} \cdot (T_{walls}^4 - T_{TS}^4) \quad [7]$$

One may solve this equation for an estimated exhaust gas temperature ("$T_{exhaustgas}$"), yielding, $$T_{exhaustgas} = T_{TS} + \frac{m_{TS} \cdot c_{TS}}{h_{TS} \cdot A_{TS}} \cdot \frac{dT_{TS}}{dt} - \\ \frac{\varepsilon \cdot \sigma}{h_{TS}} \cdot (T_{walls}^4 - T_{TS}^4) - \frac{U_{TS} \cdot A_{contact}}{h_{TS} \cdot A_{TS}} \cdot (T_{lead} - T_{TS}) \quad [8]$$

In the particular embodiment described above, wherein the heat transfer by conductance is said to be negligible, the term in the above equation related to conductance drops out, and the equation becomes, $$T_{exhaustgas} = T_{TS} + \frac{m_{TS} \cdot c_{TS}}{h_{TS} \cdot A_{TS}} \cdot \frac{dT_{TS}}{dt} - \frac{\varepsilon \cdot \sigma}{h_{TS}} \cdot (T_{walls}^4 - T_{TS}^4) \quad [9]$$

$T_{TS}$ is a measured value from the temperature sensor. $dT_{TS}/dt$ is a simple time derivative of the measured values from the temperature sensor which may be generated by a simple operation within a processor. $T_{walls}$ is the temperature of walls 55 and is a value which is frequently modeled at different engine conditions and is readily available in the art. $T_{lead}$ can be similarly derived and will frequently be a function of $T_{walls}$. $A_{TS}$, $A_{contact}$, $m_{TS}$, and $\epsilon$ are known values which may be programmed for a given temperature sensor. $c_{TS}$, $h_{TS}$, $U_{TS}$ and $\sigma$ are constants which may also be programmed. Because all of the values of the above equation may be determined in an in-vehicle setting on the basis of an incoming stream of $T_{TS}$ values, $T_{exhaustgas}$ may be calculated in real-time. The resulting $T_{exhaustgas}$ value may then be used to adjust engine or aftertreatment parameters according to actual exhaust temperatures.

The exemplary embodiment of temperature sensor 40 illustrated in FIG. 3 is commonly known as an exposed junction thermocouple. However, it will be appreciated that the methods disclosed herein are widely applicable in any gas flow across varied designs of thermocouples as well as resistive temperature detection (RTD) devices such as wire RTD or semiconductor thermistors. For example, thermocouples and resistive temperature detection sensors can also be constructed with an exposed sensing element or with a sheath which covers the sensing element. The sensing element can be insulated from or in contact with the internal wall of the protective sheath. In these sheathed designs, the additional conductive energy flow across the sheath and an insulation layer could be accounted for using the same methods disclosed herein. Numerous methodologies are utilized in the design of temperature sensors, and this disclosure is not intended to be limited to the examples here described. By summing the energy flows entering and leaving the temperature sensor and equating these energy flows to the thermal properties of the temperature sensor, one may solve for the estimated actual gas temperature. In this way, various types of temperature sensors may be used to accurately estimate actual gas temperatures.

Figure 4:
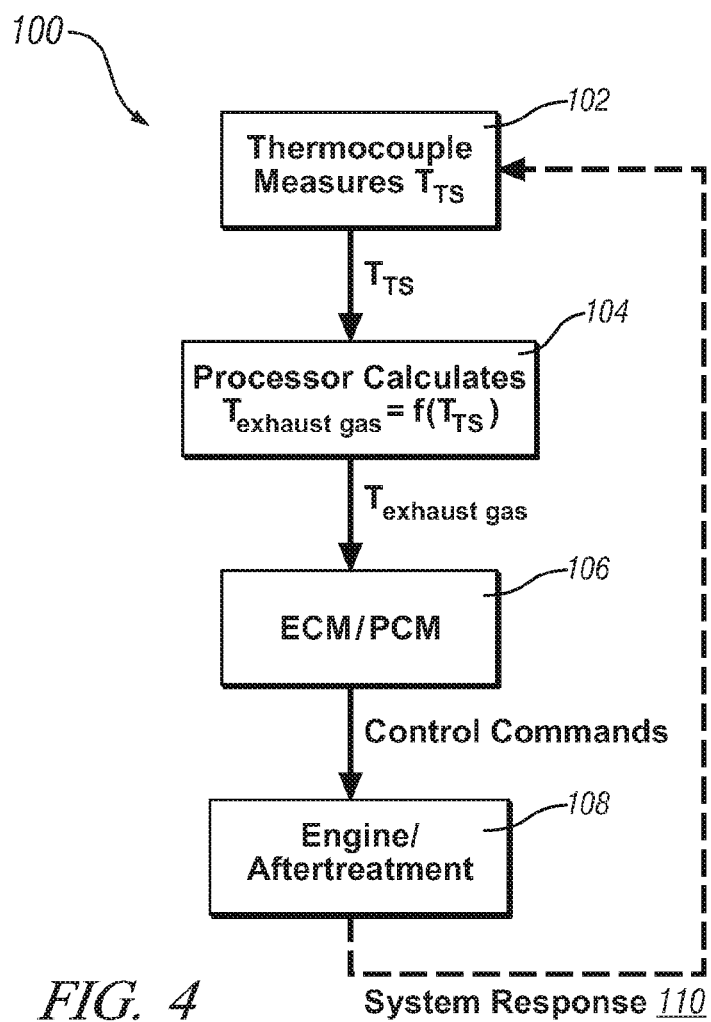
FIG. 4 is a flowchart illustrating an exemplary process utilizing an estimated exhaust gas temperature in accordance with the present disclosure.

FIG. 4 is a flowchart depicting an exemplary process 100 in accordance with the disclosure. At step 102, temperature sensor 40 measures a temperature reading $T_{TS}$. At step 104, a processor is employed to apply a function estimating $T_{exhaustgas}$ as a function of $T_{TS}$. $T_{exhaustgas}$ is then fed at step 106 to an engine control module or, in the case of a hybrid drive application, a powertrain control module. It should be noted that the processor of step 104 could be a physically independent unit from the control module of step 106, or the processor could be integral to the control module. The control module of step 106 then issues control commands to the engine and to the aftertreatment components in step 108 in order to affect the engine controls and exhaust processing controls for improved fuel and emission efficiencies. Process 100, in terms of information flow, ends at step 108; however, the dotted line at step 110 reflects that the control commands affected at step 108 clearly have an effect on exhaust temperature as engine operation is modulated.

Figure 5:
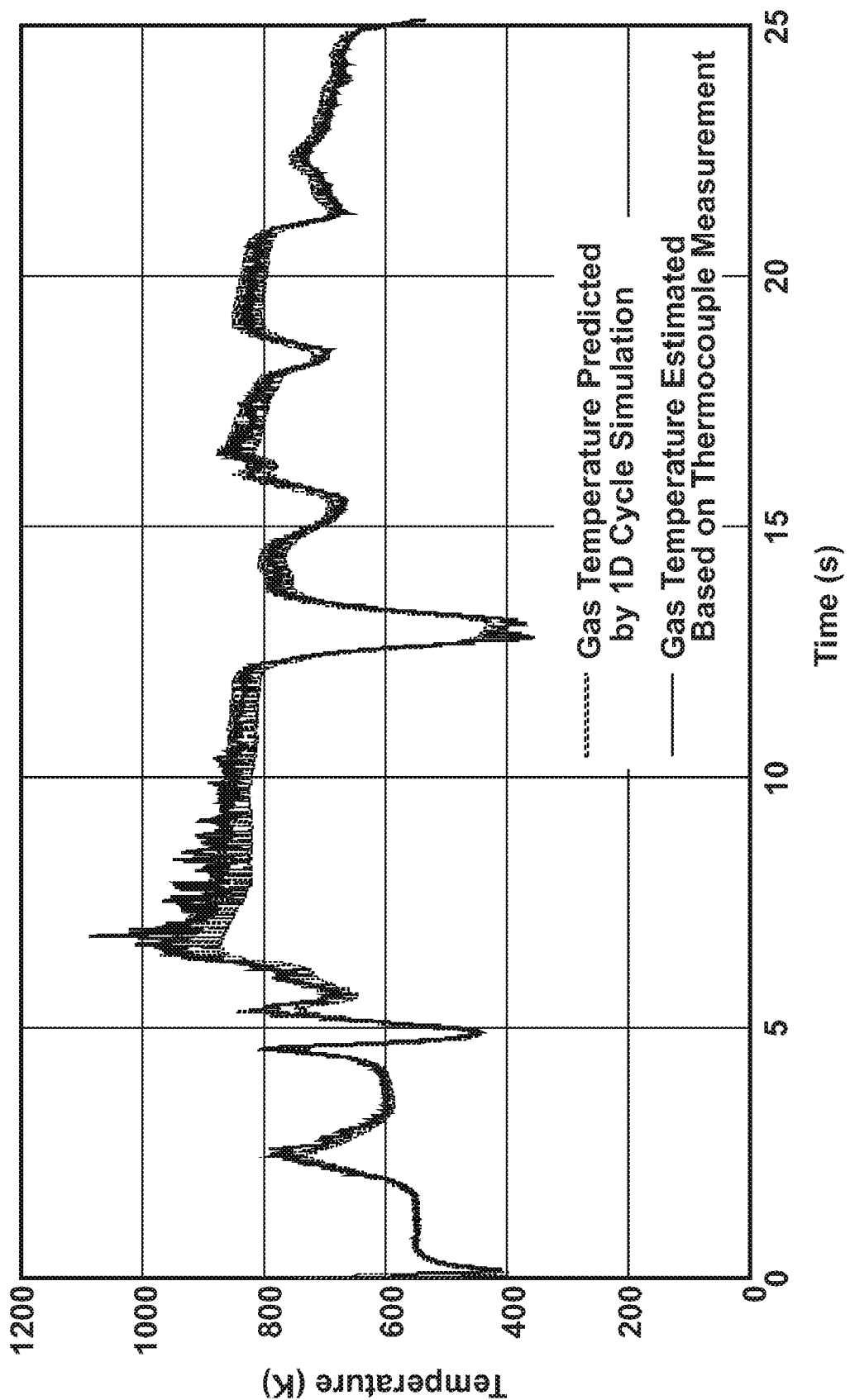
FIG. 5 is a graphical representation depicting test results of exemplary estimated exhaust gas temperatures as compared to simulated exhaust gas temperatures in accordance with the present disclosure.

FIG. 5 graphically depicts test results of a system wherein engine readings from temperature sensor 40 are used to estimate $T_{exhaustgas}$ in accordance with the disclosure. This graph compares the $T_{exhaustgas}$ estimate generated by actual thermocouple readings applied to the above equation and a simulated exhaust gas temperature generated by an off-line computer model simulating actual exhaust gas temperatures. The graph shows $T_{exhaustgas}$ closely tracking the simulated exhaust gas temperature without the lag or averaging effect apparent to the results of FIG. 2.

The disclosure has described certain preferred embodiments and modifications thereto. Further modifications and alterations may occur to others upon reading and understanding the specification. Therefore, it is intended that the disclosure not be limited to the particular embodiment(s) disclosed as the best mode contemplated for carrying out this disclosure, but that the disclosure will include all embodiments falling within the scope of the appended claims.

The invention claimed is:

1. A method for accurate estimation of a gas temperature in a gas flow at transient conditions based on temperature sensor readings comprising:
    measuring said temperature sensor readings from a temperature sensor in said gas flow; and
    estimating in real-time said gas temperature on the basis of said temperature sensor readings, wherein said estimating comprises:
    equating the specific heat properties of said temperature sensor to a sum of heat flow equations describing heat flow into said temperature sensor, the equations comprising:
    a convection heat flow equation based upon Newton's Law of Cooling describing heat flow into said temperature sensor based upon said measured temperature sensor readings and said gas temperature; and
    a radiation heat flow equation based upon a Stefan-Boltzmann Law describing heat flow into said temperature sensor based upon said measured temperature sensor readings; and
    solving said equated specific heat properties and sum of heat flow equations for said gas temperature.

2. The method of claim 1, wherein said temperature sensor is a thermocouple.

3. The method of claim 2, wherein said thermocouple is an exposed junction thermocouple.

4. The method of claim 1, wherein said temperature sensor is a resistive temperature detection device.

5. The method of claim 4, wherein said resistive temperature detection device is a wire resistive detection device.

6. The method of claim 4, wherein said resistive temperature detection device is a semiconductor thermistor.

7. The method of claim 1, wherein gas flow is an exhaust gas flow in an engine and said gas temperature is an exhaust gas temperature.

8. The method of claim 7, further comprising utilizing said exhaust gas temperature to modulate operation of said engine.

9. The method of claim 7, further comprising utilizing said exhaust gas temperature to modulate operation of a hybrid drive powertrain.

10. The method of claim 7, further comprising utilizing said exhaust gas temperature to modulate aftertreatment of said exhaust gas flow.

11. A method for accurate estimation of an exhaust gas temperature in an exhaust gas flow at transient conditions based on exposed junction thermocouple readings comprising:
    measuring said exposed junction thermocouple readings from an exposed junction thermocouple in said exhaust gas flow; and
    estimating in real-time said exhaust gas temperature on the basis of said exposed junction thermocouple readings, wherein said estimating comprises:
    equating the specific heat properties of said exposed junction thermocouple to a sum of heat flow equations describing heat flow into said exposed junction thermocouple, the equations comprising:

a convection heat flow equation based upon Newton's Law of Cooling describing heat flow into said exposed junction thermocouple based upon said measured exposed junction thermocouple readings and said gas temperature; and a radiation heat flow equation based upon a Stefan-Boltzmann Law describing heat flow into said exposed junction thermocouple based upon said measured exposed junction thermocouple readings; and solving said equated specific heat properties and sum of heat flow equations for said gas temperature.

12. The method of claim 11, further comprising utilizing said exhaust gas temperature to modulate operation of an engine.

13. The method of claim 11, further comprising utilizing said exhaust gas temperature to modulate operation of a hybrid drive powertrain.

14. The method of claim 11, further comprising utilizing said exhaust gas temperature to modulate aftertreatment of said exhaust gas flow.

15. An apparatus for accurate estimation of a gas temperature in a gas flow at transient conditions, comprising:

a temperature sensor located in said gas flow; and a processor operative to estimate in real-time said gas temperature on the basis of readings from said temperature sensor, wherein said processor:

equates the specific heat properties of said temperature sensor to a sum of heat flow equations describing heat flow into said exposed junction thermocouple, the equations comprising:

a convection heat flow equation based upon Newton's Law of Cooling describing heat flow into said exposed junction thermocouple based upon said measured exposed junction thermocouple readings and said gas temperature; and a radiation heat flow equation based upon a Stefan-Boltzmann Law describing heat flow into said exposed junction thermocouple based upon said measured exposed junction thermocouple readings; and solves said equated specific heat properties and sum of heat flow equations for said gas temperature.

16. The apparatus of claim 15, further comprising a control module operative to issue control commands to an engine on the basis of said gas temperature.

17. The apparatus of claim 15, further comprising a control module operative to issue control commands to a hybrid drive powertrain on the basis of said gas temperature.

18. The apparatus of claim 15, further comprising a control module operative to issue control commands to an aftertreatment device on the basis of said gas temperature.

19. The apparatus of claim 15, wherein said temperature sensor is an exposed junction thermocouple.

20. The apparatus of claim 15, wherein said temperature sensor is a resistive temperature detection device.

* * * * *